US006054146A

United States Patent [19]
Ballard et al.

[11] Patent Number: 6,054,146
[45] Date of Patent: Apr. 25, 2000

[54] WAX-BASED FISH FOOD COMPOSITIONS, ARTICLES AND RELATED METHODS

[75] Inventors: Frank Wyman Ballard, Provo; Dean E. Lundberg, Lindon; L. M. Brown; Adair Rice Sheehan, both of Sandy, all of Utah

[73] Assignee: HBH Enterprises, Springville, Utah

[21] Appl. No.: 08/997,149

[22] Filed: Dec. 23, 1997

[51] Int. Cl.$^7$ .............................. A23K 1/00; A23C 19/00
[52] U.S. Cl. ............................. 426/2; 426/272; 426/274; 426/623; 426/635; 426/805
[58] Field of Search .................... 426/623, 635, 426/805, 1, 2, 89, 272, 274

[56] References Cited

U.S. PATENT DOCUMENTS

| | | | |
|---|---|---|---|
| 2,904,436 | 9/1959 | Auerbach | 99/3 |
| 4,150,162 | 4/1979 | Goldstein et al. | 426/335 |
| 4,413,014 | 11/1983 | Melancon | 426/1 |
| 4,853,242 | 8/1989 | Poeppinghausen | 426/516 |
| 4,935,250 | 6/1990 | Cox | 426/94 |
| 5,128,153 | 7/1992 | Axelrod | 426/2 |

FOREIGN PATENT DOCUMENTS

| | | |
|---|---|---|
| 0425213 | 10/1989 | European Pat. Off. . |
| 8601424 | 9/1986 | Rep. of Korea . |

OTHER PUBLICATIONS

*A Dictionary of Chemistry,* Third Edition, Edited by John Daintith, Oxford University Press, New York, pp. 374–375, (1996).

*Hawley's Condensed Chemical Dictionary,* Twelfth Edition, Revised by Richard J. Lewis, Sr., Van Nostrand Reinhold Company, New York, p. 871, (1993).

*Hackh's Chemical Dictionary,* Fourth Edition, Revised by Julius Grant, McGraw–Hill Book Company, pp. 488–489, (1969).

*Primary Examiner*—Nina Bhat
*Attorney, Agent, or Firm*—Workman Nydegger Seeley

[57] ABSTRACT

Fish aquarium owners are enabled to feed fish during an extended absence through the use of wax-based fish food compositions. Fish food and a water-expandable material, such as clay, are substantially homogenous distributed within wax. The wax protects the fish food from spoilage due to premature exposure to water and from accessibility to undesired microorganisms, thereby enabling large concentrations of fish food to be included. The water-expandable materials expand after being immersed in the water, thereby enabling the article to become softened or to be fragmented. Accordingly, fish can ingest fragments of a wax-based block which then pass through the gastrointestinal tract of the fish without causing an obstruction.

34 Claims, 2 Drawing Sheets

WAX-BASED FISH FOOD COMPOSITIONS, ARTICLES AND RELATED METHODS

BACKGROUND OF THE INVENTION

1. The Field of the Invention

The present invention is related to fish food compositions for use in aquariums. More particularly, the present invention is useful as food for aquarium fish over extended periods of time such that the aquarium fish have a food source for predetermined time periods.

2. The Relevant Technology

Owners of aquarium fish planning a vacation must make arrangements to ensure that the fish will have an adequate food supply during their absence. Fish food suppliers presently provide products which are marketed for their usefulness as a food source for fish for several days, which are referred to as vacation or holiday feed blocks or pellets.

Many holiday feed blocks are formed primarily from plaster of paris (calcium sulfate or gypsum hemihydrate). Such feed blocks are up to 98% plaster of paris and accordingly have only a minute amount of protein available in the blocks for the fish. Additionally, the plaster of paris dissolves too quickly to be used for extended periods of time. Accordingly, such compositions are of limited use.

The composition of another holiday feed block is disclosed in U.S. Pat. No. 4,853,242 issued to Poeppinghausen (hereinafter "the Poeppinghausen patent"). The holiday feed composition is disclosed in the Poeppinghausen patent as comprising a combination including casein, gluten, clay, rubber and cement. The primary difficulty with the Poeppinghausen patent composition is that it is very susceptible to spoilage during storage and also after being placed in an aquarium. The spoilage results from the inability to prevent access to the components which attract undesired microorganisms. Additionally, the pellets break apart too rapidly to be utilized for extended periods of time, such as a week. Further, it is difficult for fish to obtain protein from the protein sources in the pellets.

Accordingly, there is a need for improved fish food compositions, articles and related methods that overcome or avoid the above problems.

SUMMARY AND OBJECTS OF THE INVENTION

The present invention has been developed in response to the present state of the art and, in particular, in response to problems and needs that have not been fully or completely solved by currently available vacation fish food block compositions.

Accordingly, it an object of the present invention to provide a vacation fish food block that will have a long shelf life and will not spoil after being placed in an aquarium within the time period desired for the block to feed the fish.

It is also an object of the present invention to provide a vacation fish food block that provides fish with adequate food, particularly protein, during the period of its intended use.

A feature of the invention which enables the above identified objects to be achieved is the substantially homogenous distribution of fish food and a water-expandable material, such as clay, within wax. The wax protects the fish food and when necessary also the water-expandable material from spoilage due to premature exposure to water and from accessibility to undesired microorganisms. Since the wax protects the fish food from spoilage during storage and also after placement in an aquarium, large concentrations of fish food can be included in the blocks in forms that are easy for the fish to ingest and obtain protein therefrom.

The water-expandable material enables the matrix formed by the wax to become softened or to be fragmented as the clay or other material expands after being immersed in the water. Accordingly, the fish can ingest fragments of a block which then pass through the gastrointestinal tract of the fish without causing an obstruction. To enhance the ability of the water-expandable material to cause adequate fragmentation, the material preferably has a relatively small average particle size and is relatively uniformly dispersed within the wax.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings listed hereinbelow.

DETAILED DESCRIPTION OF THE PREFERRED EMBODIMENTS

The present invention is directed to providing food for aquarium fish over extended periods of time such that the aquarium fish have a food source for predetermined time periods. Accordingly, fish food compositions for use in aquariums and methods for making the compositions are disclosed herein as well as the articles formed from the compositions. The articles are particularly useful as vacation food blocks to provide fish food for various time periods, such as 3 or 7 days, during the absence of those responsible for maintaining an aquarium.

Figure 1:
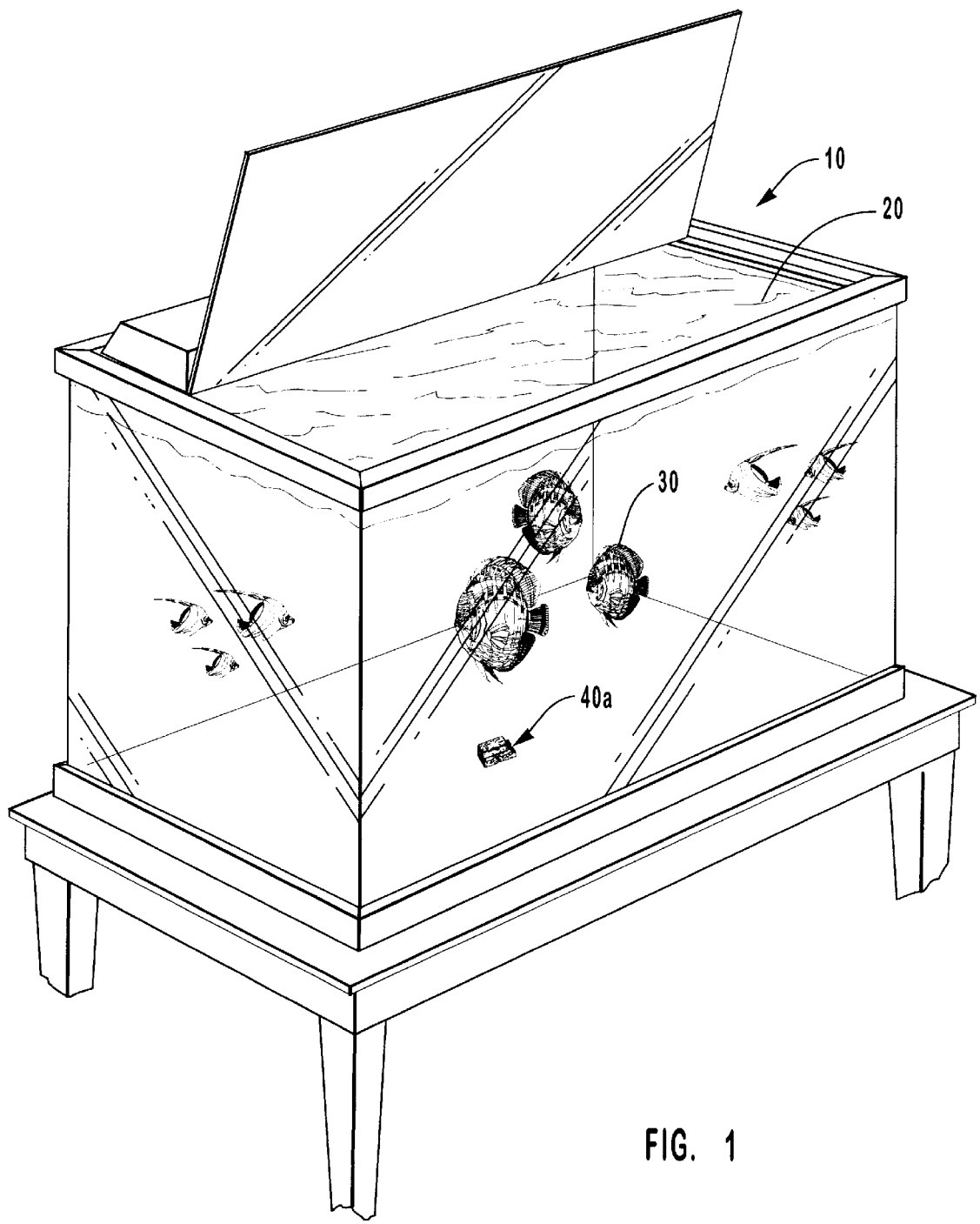
FIG. 1 is a perspective view of a fish aquarium with a wax-based fish food block located at the bottom of the aquarium.

FIG. 1 depicts an aquarium 10 containing water 20, fish 30 and an article 40a formed in accordance with the present invention. Article 40a, which is a fish food block formed from the composition of the present invention, is shown in greater detail in FIG. 2. While the articles formed from the fish food compositions disclosed herein are depicted as blocks, the articles may have any form.

The fish food compositions comprise a mixture of wax, fish food, a water-expandable material, such as clay, and optionally other additives such as preservatives. It is very surprising that fish food compositions containing wax are suitable for use as vacation food blocks as it is generally known that wax may be harmful to most aquarium fish. Wax is considered potentially harmful as the wax tends to obstruct the gastrointestinal tract which may result in injury or death to the fish. However, it was unexpectedly discovered that when water-expandable materials and food are substantially homogeneously distributed or dispersed within wax to form a vacation food block, the swelling of the water-expandable materials enables aquarium fish to safely ingest the composition.

The water-expandable materials enable fish to safely ingest the wax-based compositions as the expansion of the water-expandable materials causes the wax to fragment into small particles which safely pass through the fish. The composition may be adequately fragmented before ingestion by a fish. Additionally, further fragmentation may continue to occur within the gastrointestinal tract of a fish due to expansion of the water-expandable material alone or also in combination with the combined action of the gastrointestinal tract of a fish to enable the composition to safely pass through the gastrointestinal tract of the fish.

After vacation food block 40a is immersed in water by being placed in an aquarium as shown in FIG. 1, the water-expandable material expands and causes the article, more specifically the matrix of the article, to either soften or fragment, particularly at the exterior of the article. The fish then either remove fragments from the remainder or ingest fragments which have separated from block 40a. Block 40a is accordingly reduced in size as additional portions are exposed to water and the nibbling of fish. This process continues to expose additional portions of the article until the entire fish food block has been fragmented into sizes that are ingestible by the aquarium fish or have been ingested by fish.

Depending on the type and size of fish food, some fish food may be fully exposed and easily ingested by the fish without ingesting wax or water-expandable material. However, the fish may also ingest a substantial amount of wax and water in order to ingest some fish food which is anchored within the matrix of the article. Eventually, the fish remove all of the fish food and the remains are water-expandable materials and wax which have not been ingested or has been excreted by the fish.

There are many advantages to the use of wax as a binder to hold the matrix of the article together until the article is exposed to water and as a result the fragmentation effect of the water-expandable material. The wax protects the fish food and when necessary also the water-expandable material from spoilage due to premature exposure to water and from accessibility to undesired microorganisms. Since the wax protects the fish food from spoilage during storage and also after placement in an aquarium, large concentrations of fish food can be included in the blocks in forms that are easy for the fish to ingest and obtain protein.

The article is formed by melting wax and then adding the other constituents to the molten wax. The mixture is then mixed such that the constituents are substantially homogeneously distributed or dispersed. The sequence in which the various constituents are added is not necessarily important, although, it is preferable to add optional components such as propylene glycol and spirulina before the water-expandable material. The mixture is then poured into a mold while the wax is still hot. After the mixture has hardened, it is removed from the mold to yield an article ready for use as a fish food vacation block. It is preferred to form the blocks within large molds to increase the efficiency of the process.

Figure 2:
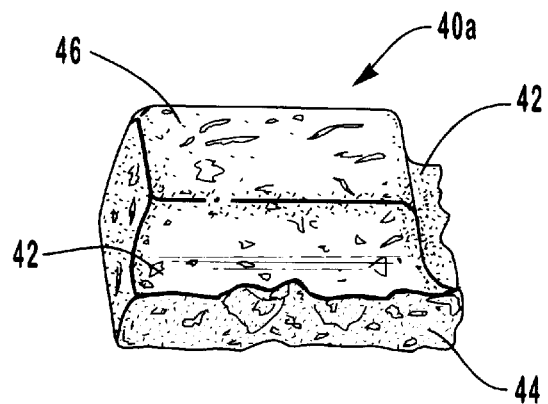
FIG. 2 is a perspective view of the wax-based fish food block shown in FIG. 1.
Figure 3:
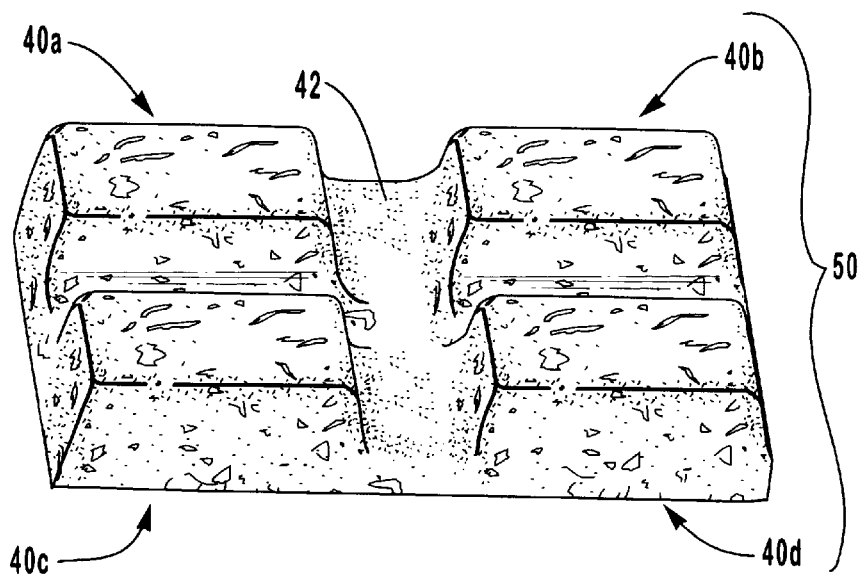
FIG. 3 is a perspective view of the wax-based fish food block shown in FIG. 2 before being separated from a larger portion of a wax-based fish food block.

FIG. 3 depicts an example of an article 50 with separable blocks 40a, 40b, 40c and 40d which were formed in one mold. The separable blocks are divided by depressions or thin sections 42 which enables the separable blocks to be easily separated as shown in FIG. 2. Article 50 can be sold as shown or the separable blocks may be separated and sold individually.

After the separable blocks have been separated by fracturing the thin section 42, the interior portion 44 is exposed. The interior portion is porous compared to the skin portion 46 of the article, or more specifically the matrix of the article. The porosity enables the water to better penetrate the article to cause the water-expandable materials to swell or expand. Additionally, the ability of the fish to remove fragments from an article is enhanced when the article is configured such that the inner portion 44 of the article is exposed as the varied surfaces provide a texture that is easier for the fish to nibble.

Figure 4:
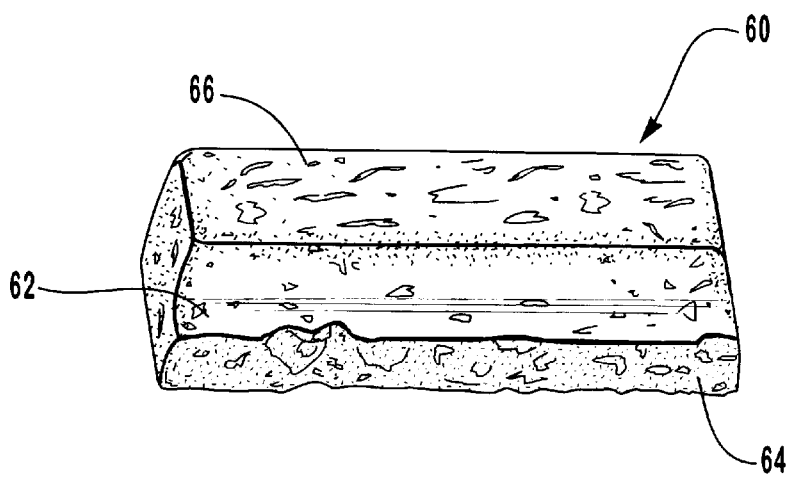
FIG. 4 is a perspective view of a wax-based fish food block that is larger than the wax-based fish food block shown in FIG. 2 and able to last longer in an aquarium when formed from the same composition as the block shown in FIG. 2.

As shown in FIG. 2, article 40a may have two sides which expose the inner portion 44. An article may also be formed as shown in FIG. 4 at 60 which has only one side that exposes the inner portion 64. Similarly, an article may be formed without any exposure of the inner portion as shown in FIG. 3. The shelf life can be further enhanced when the articles are sold as shown in FIG. 3.

The amount of surface area of the inner portion that is exposed impacts the rate at which the article is reduced in size by fragmentation due to either nibbling of the fish or swelling of the water-expandable material. As previously indicated, the wax-based fish food compositions can be formed into articles having any desired shapes. Accordingly, while the articles shown are blocks or bars many other configurations are also possible such as pellets or more complex shapes.

Additionally, the articles can have different sizes to provide food for different length of time. For example, article 40a may be useful as a fish food vacation block to feed fish for three days while article 60 may be adequate for one week when formed from the same composition and yet having greater mass.

The wax may be any suitable wax. For example, the wax-based composition may utilize a wax which is an insect wax, an animal wax, a vegetable wax, a mineral wax, a synthetic wax, a derivative of the foregoing or any mixture of the foregoing. The preferred waxes include beeswax and paraffin wax. Paraffin wax is relatively inexpensive and beeswax provides a desirable color.

The amount of wax can be varied depending on the desired properties. Accordingly, any suitable amount of wax may be utilized. Generally, the wax is included in sufficient concentration to act as a binder in order to hold the fish food and, to a lesser extent, the water-expandable material together or to form a matrix. Accordingly, the wax concentration can be increased in order to increase the binding capacity as necessary. Additionally, the wax content also impacts the length of time that a wax-based vacation block will last in an aquarium. By increasing the concentration of the wax, the lifespan of the block in the aquarium can be lengthened. Conversely, decreasing the wax concentration enhances the ability of the water-expandable material to fragment the wax matrix.

The varying the wax content may also impacts other properties. Since the wax encapsulates the food particles which protects the food particles from undesired microorganisms and premature exposure to water, the ability to minimize or prevent spoilage may be impacted by the wax content. By including the proper amount of wax, the article can have a substantially long shelf life and avoid spoilage after being placed in an aquarium.

In light of the above factors, the wax is preferably included in amount ranging from about 10% by weight of the composition to about 80% by weight of the composition. The wax content is more preferably included in amount ranging from about 30% by weight of the composition to about 60% by weight of the composition and most preferably in amount of about 40% by weight of the composition.

The water-expandable or swellable material is any material capable of being intermixed with wax and of expanding or swelling after being immersed in water. The preferred material is clay. In addition to clay, other examples of water-expandable materials include bran from any grain, soy flour, whey, casein, protein powder, flour including gluten, and grain germ such as wheat germ.

One reason clay is preferred is that it does not spoil or attract undesired microorganisms. Additionally, clay causes the wax to sink to the bottom of the aquarium, which is generally preferable. Clay also enables the remaining fragments and excreted fragments to remain on the bottom of the aquarium. Accordingly, water-expandable materials capable of enabling the wax-based composition to sink to the bottom and stay on the bottom of the aquarium are preferred. Another benefit of the use of clay is that the clay color is altered as it expands.

The amount of water-expandable materials can be varied depending on the desired properties such as expansion rate and density of the article. The expansion rate is generally accelerated as more water-expandable materials are utilized. Additionally, when materials such as clay are utilized, increasing the concentration of the water-expandable material also increases the density of the article.

Although, any suitable amount of water-expandable material may be utilized, the water-expandable material is preferably included in amount ranging from about 5% by weight of the composition to about 50% by weight of the composition. The water-expandable material content is more preferably included in an amount ranging from about 10% by weight of the composition to about 30% by weight of the composition and most preferably in amount of about 20% by weight of the composition.

The water-expandable material preferably has an average particle size which enables the water-expandable material to be homogeneously distributed within the wax such that expansion of the water-expandable material results in fragmentation of the resulting article formed therewith or stated otherwise, the fragmentation of the wax matrix of the article. The actual average particle size varies depending on the type of water-expandable material utilized and also the properties that are desired. When clay is utilized, the clay preferably has an average particle size of about 200 mesh (about 75 microns). However, any suitable size is appropriate. For example, the average particle size may range from about ⅛ of an inch (about 3 mm) to about 600 mesh and is preferably within a range from about 100 mesh to about 400 mesh.

The fish food may be any suitable fish food. The fish food can be in any form such as pellets or flakes. The fish food may have any suitable concentration depending on the desired properties such as the intended time period for use of the article as a food source. Although, any suitable amount of fish food may be utilized, the fish food is preferably included in an amount ranging from about 2% by weight of the composition to about 60% by weight of the composition. The fish food content is more preferably included in amount ranging from about 30% by weight of the composition to about 50% by weight of the composition and most preferably in amount of about 40% by weight of the composition.

As previously indicated, the wax-based composition preferably further includes optional additives. For example, food grade preservative such as propylene glycol is preferably included. It also preferable to add a colorant such as spirulina.

EXAMPLES OF THE PREFERRED EMBODIMENTS

Examples are provided of the present invention in order to compare the properties of the compositions by varying the content of the components of the wax-based fish food composition. Example 1 is a preferred composition. Examples 2–5 describe other wax-based fish food compositions which were prepared in accordance with the present invention.

Example 1

A wax-based fish food composition was formed from the following components:

| Component | Weight in Ounces |
| --- | --- |
| Bee Wax | 0.8 |
| Paraffin Wax | 0.8 |
| Swellable Clay | 0.8 |
| Fish Food Flakes | 0.3 |
| Trout and Salmon Food | 1.24 |
| Propylene Glycol | 0.1 |
| Spirulina | 0.1 |

Blocks formed from the above composition were found to fragment at a desirable rate for use in feeding fish and had a high concentration of fish food. The percentages by weight of the primary ingredients including the wax, water-expandable material and fish food were respectively 38.6%, 19.3% and 39.6%.

Example 2

A wax-based fish food composition was formed from the following components:

| Component | Weight in Ounces |
| --- | --- |
| Bee Wax | 0.8 |
| Paraffin Wax | 0.8 |
| Swellable Clay | 0.8 |
| Fish Food Flakes | 0.3 |
| Trout and Salmon Food | 1.2 |
| Propylene Glycol | 0.1 |
| Spirulina | 0.1 |

Blocks formed from the above composition contained only slightly less fish food than the blocks formed in Example 1, however, it was preferable to have the fish food concentration obtained in Example 1.

Example 3

A wax-based fish food composition was formed from the following components:

| Component | Weight in Ounces |
| --- | --- |
| Bee Wax | 0.8 |
| Paraffin Wax | 0.8 |
| Swellable Clay | 0.8 |
| Fish Food Flakes | 0.2 |
| Trout and Salmon Food | 1.2 |
| Propylene Glycol | 0.1 |
| Spirulina | 0.1 |

Blocks formed from the above composition contained only slightly less fish food than the blocks formed in Example 1, however, it was preferable to have the fish food concentration obtained in Example 1.

Example 4

A wax-based fish food composition was formed from the following components:

| Component | Weight in Ounces |
| --- | --- |
| Bee Wax | 0.8 |
| Paraffin Wax | 0.8 |
| Swellable Clay | 1.2 |
| Fish Food Flakes | 0.3 |
| Trout and Salmon Food | 1.2 |
| Propylene Glycol | 0.1 |
| Spirulina | 0.1 |

Blocks formed from the above composition had approximately the desired fish food concentration, however, the fragmentation rate was faster than was desired.

Example 5

A wax-based fish food composition was formed from the following components:

| Component | Weight in Ounces |
| --- | --- |
| Bee Wax | 0.8 |
| Paraffin Wax | 0.8 |
| Swellable Clay | 1.2 |
| Fish Food Flakes | 0.4 |
| Trout and Salmon Food | 1.2 |
| Spirulina | 0.1 |

Blocks formed from the above composition had a greater fish food concentration than was desired and the fragmentation rate was also faster than was desired.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A molded wax-based fish food article comprising:
fish food and a water-expandable material substantially homogeneously distributed within wax;
wherein the wax has a concentration such that the fish food and water-expandable material are held together by the wax until after the article is immersed in water, wherein the water-expandable material is capable of expanding after the article is immersed in water, and wherein the water-expandable material has an average particle size and concentration that enables the article to be fragmented and to be safely ingested by fish after the article is immersed in water.

2. An article as recited in claim 1, wherein the wax is selected from the group consisting of insect waxes, animal waxes, vegetable waxes, mineral waxes, synthetic waxes, derivatives of the foregoing and mixtures of the foregoing.

3. An article as recited in claim 1, wherein the wax is selected from the group consisting of beeswax and paraffin wax.

4. An article as recited in claim 1, wherein the wax is included in the composition in an amount ranging from about 10% by weight to about 80% by weight of the composition.

5. An article as recited in claim 1, wherein the water-expandable material is clay.

6. An article as recited in claim 1, wherein the water-expandable material is selected from the group consisting of bran from any train, soy flour, whey, casein, protein powder, flour, and grain germ.

7. An article as recited in claim 1, wherein the water-expandable material is included in the composition in an amount ranging from about 5% by weight to about 50% by weight of the composition.

8. An article as recited in claim 1, wherein the average particle size of the water-expandable material ranges from about 3 mm to about 600 mesh.

9. An article as recited in claim 1, wherein the fish food is included in the composition in an amount ranging from about 2% by weight to about 60% by weight of the composition.

10. An article as recited in claim 1, further comprising a preservative.

11. A molded fish food article configured for placement in a fish aquarium, the article comprising fish food and a water-expandable material substantially homogeneously distributed within wax;
wherein the wax has a concentration such that the fish food and water-expandable material are held together by the wax until after the article is immersed in water, wherein the water-expandable material is capable of expanding after the article is immersed in water, and wherein the water-expandable material has an average particle size and concentration that enables the article to be immersed in water and then fragment over a period of time of at least 3 days into fragments that are sized to be safely ingested by fish.

12. An article as recited in claim 11, wherein the article has an exterior skin around an interior portion that is more porous than the interior skin, and wherein a portion of the interior portion is exposed to enable water and fish to access the interior portion.

13. An article as recited in claim 11, wherein the article has separable blocks, and wherein each separable block has an exterior skin around an interior portion that is more porous than the interior skin, and wherein separation of the separable blocks exposes a portion of the interior portion to enable water and fish to access the interior portion.

14. An article as recited in claim 11, wherein the wax is selected from the group consisting of insect waxes, animal waxes, vegetable waxes, mineral waxes, synthetic waxes, derivatives of the foregoing and mixtures of the foregoing.

15. An article as recited in claim 11, wherein the wax is selected from the group consisting of beeswax and paraffin wax.

16. An article as recited in claim 11, wherein the wax is included in the mixture in an amount ranging from about 10% by weight to about 80% by weight of the mixture.

17. An article as recited in claim 11, wherein the water-expandable material is clay.

18. An article as recited in claim 11, wherein the water-expandable material is selected from the group consisting of bran from any grain, soy flour, whey, casein, protein powder, flour, and grain germ.

19. An article as recited in claim 11, wherein the water-expandable material is included in the mixture in an amount ranging from about 5% by weight to about 50% by weight of the mixture.

20. An article as recited in claim 11, wherein the average particle size of the water-expandable material ranges from about 3 mm to about 600 mesh.

21. An article as recited in claim 11, wherein the fish food is included in the mixture in an amount ranging from about 2% by weight to about 60% by weight of the mixture.

22. An article as recited in claim 11, wherein the mixture further comprise a preservative.

23. A method for molding a wax-based fish food article configured for placement in a fish aquarium comprising:

melting a wax to yield a molten wax, adding fish food and a water-expandable material to the molten wax;

mixing the fish food and the water-expandable material within the molten wax until the fish food and water-expandable material are substantially homogeneously distributed within the molten wax to yield a homogenous mixture;

allowing the mixture to cool within a mold and form a wax-based fish food article such that the fish food and water-expandable material are held together by the wax; and removing the article from the mold.

24. A method as recited in claim 23, wherein the article has an exterior skin around an interior portion that is more porous than the interior skin, and wherein a portion of the interior portion is exposed to enable water and fish to access the interior portion.

25. A method as recited in claim 23, wherein the article has separable blocks, and wherein each separable block has an exterior skin around an interior portion that is more porous than the interior skin, and wherein separation of the separable blocks exposes a portion of the interior portion to enable water and fish to access the interior portion.

26. A method as recited in claim 23, wherein the wax is selected from the group consisting of insect waxes, animal waxes, vegetable waxes, mineral waxes, synthetic waxes, derivatives of the foregoing and mixtures of the foregoing.

27. A method as recited in claim 23, wherein the wax is selected from the group consisting of beeswax and paraffin wax.

28. A method as recited in claim 23, wherein the wax is included in the mixture in an amount ranging from about 10% by weight to about 80% by weight of the mixture.

29. A method as recited in claim 23, wherein the water-expandable material is clay.

30. A method as recited in claim 23, wherein the water-expandable material is selected from the group consisting of bran from any grain, soy flour, whey, casein, protein powder, flour, and grain germ.

31. A method as recited in claim 23, wherein the water-expandable material is included in the mixture in an amount ranging from about 5% by weight to about 50% by weight of the mixture.

32. A method as recited in claim 23, wherein the average particle size of the water-expandable material ranges from about 3 mm to about 600 mesh.

33. A method as recited in claim 23, wherein the fish food is included in the mixture in an amount ranging from about 2% by weight to about 60% by weight of the mixture.

34. A method as recited in claim 23, wherein the mixture further comprise a preservative.

* * * * *